(No Model.)
C. HALSTEAD.
COFFEE URN.
No. 270,788.  Patented Jan. 16, 1883.
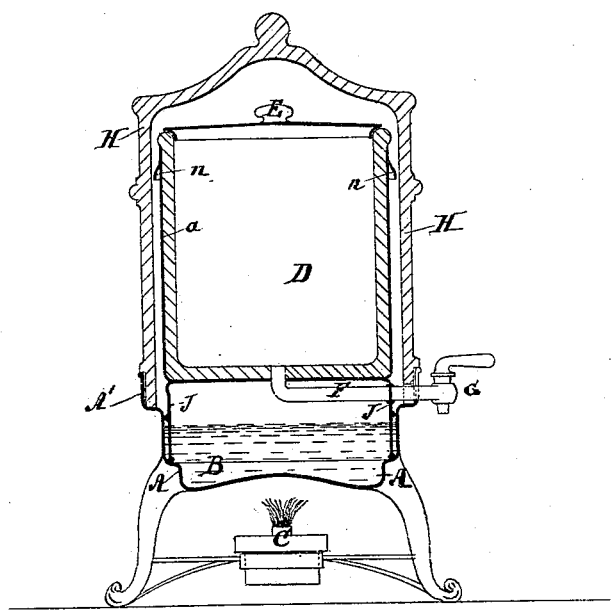
Witnesses
Inventor
Charles Halstead
per Henry E. Roeder
Attorney.

UNITED STATES PATENT OFFICE.

CHARLES HALSTEAD, OF NEW YORK, N. Y.

COFFEE-URN.

SPECIFICATION forming part of Letters Patent No. 270,788, dated January 16, 1883.

Application filed June 21, 1882. (No model.)

*To all whom it may concern:*

Be it known that I, CHARLES HALSTEAD, of New York, in the State of New York, have invented a new and useful Improvement in Coffee Urns, of which the following is a specification.

The nature of my invention consists in surrounding the vessel containing the coffee by a china or an earthenware vessel, first, for the purpose of better retaining the heat, and, secondly, for the purpose of making the coffee-urn to correspond with the style of china used on the table; and, further, in the arrangement of a water-basin in which the internal coffee-urn is placed so as to surround the same with steam, and thus keep the coffee warm for any length of time.

In the accompanying drawing a vertical section of my improved coffee-urn is represented.

A represents the lower part or foot of the urn to support the same, and arranged with a deep chamber, B, for the reception of water.

C is a lamp arranged in the foot for heating the water in said chamber B.

D is the coffee-pot, preferably made of china or earthenware, inclosed in a metallic case, a, and provided with suitable projections, n n, to facilitate the lifting and carrying of the same, and with a cover, E. To the bottom of this coffee-pot D a pipe, F, is attached, provided with a suitable cock, G, of proper length to project outside of the lower part or foot, A. To the lower end of the coffee-pot D a deep rim, J, is attached, resting upon the bottom of the foot A in the water-chamber B, to support the coffee-pot at the proper height above the water in said chamber B, and at the same time to support the outer end of the pipe F.

The upper part, A', of the foot A is enlarged to receive and support a china or earthenware chamber, H, inclosing the whole of the inner coffee-pot, D. The exterior surface of this chamber H may be of any desired shape or configuration, and may be ornamented to correspond with the china-service in use.

It will be understood that an opening must be made in the front of the enlarged part A' to allow the pipe F to pass into and a corresponding slit in the lower part of the chamber H to pass over this pipe F.

In very large coffee-urns the water in the chamber B may be heated and kept hot by an arrangement of steam-pipes placed in the inside of said chamber instead of the lamp C.

What I claim as my invention, and desire to secure by Letters Patent, is—

A coffee-urn consisting of the lower part or foot, A, provided with a water-chamber, B, in combination with the coffee-pot D, provided with projecting rim J at the bottom, and the surrounding china or earthenware chamber H, the whole being arranged to operate in the manner and for the purpose substantially as described.

CHARLES HALSTEAD.

Witnesses:
   HENRY E. ROEDER,
   RICHARD F. NAGLE.